Sept. 2, 1969  G. T. JOHNSTON ET AL  3,465,233
SELF-COMMUTATING INVERTER

Filed Jan. 10, 1968  4 Sheets-Sheet 1

INVENTORS
GERALD T. JOHNSTON
JOSEPH W. FLEMING
ROBERT L. BOYD

Kenyon & Kenyon
ATTORNEYS

INVENTORS
GERALD T. JOHNSTON
JOSEPH W. FLEMING
ROBERT L. BOYD
BY
Kenyon & Kenyon
ATTORNEYS

United States Patent Office 3,465,233
Patented Sept. 2, 1969

3,465,233
SELF-COMMUTATING INVERTER
Gerald T. Johnston, Mahwah, Joseph T. Fleming, Ramsey, and Robert L. Boyd, Woodcliff Lake, N.J., assignors to Ramsey Controls, Inc., Mahwah, N.J., a corporation of New Jersey
Filed Jan. 10, 1968, Ser. No. 696,743
Int. Cl. H02m 7/44, 7/68
U.S. Cl. 321—45      20 Claims

ABSTRACT OF THE DISCLOSURE

A self-commutating inverter for converting direct electrical current to variable frequency alternating electrical current. Controlled rectifiers are gated to conduction at predetermined intervals to produce the desired frequency of the alternating current output. The controlled rectifiers are self-commutated by means of a commutating circuit. Energy stored within the commutating circuit during the conduction cycle of one controlled rectifier is utilized at the start of the conduction cycle of another controlled rectifier to produce a reverse bias voltage to commutate the former off.

BACKGROUND OF THE INVENTION

In many applications, it is desirable to supply a variable frequency to an AC load. In one such application, the speed of AC inductive and synchronous motors is varied by varying the frequency and voltage of the excitation voltage.

Early adjustable frequency drives comprised an AC generator driven by a constant speed driver. The frequency of the generator was varied by changing the sheave ratio between the driver and the generator. Such drives suffered the disadvantage of not being capable of providing infinitely adjustable frequency over a wide range of motor speeds. Later mechanical-electrical drives, such as the Scherbius and Kramer drives, suffered from one or more of the disadvantages of great size and complexity, inability to provide variable voltage and frequency over a wide range, high cost, and maintenance problems due to the large number of moving elements.

The introduction of static solid state components within recent years has provided the potential tools for improving the adjustable frequency drives theretofor used. However, up to the present, variable frequency AC motor drives utilizing solid state components such as silicon controlled rectifiers (SCR's) have not found wide acceptance where it was necessary to provide an AC output which was variable over a wide range of voltages and frequencies. Where SCR drives have been used, applications requiring voltages and frequencies down to zero volt and frequency necessitated utilization of more complex inverter circuits for commutation of the SCR's. Thus commutation has been accomplished through external pulse sources or through the use of auxiliary SCR's. Where self-commutation has been used, the conventional inverter circuit has required very close coupling between windings of the commutating choke, thus necessitating the use of a relatively expensive component such as a bifiler wound air choke or toroidally wound iron core choke.

SUMMARY OF THE INVENTION

It is thus an object of the present invention to provide an inverter which is low in cost, small in size, highly efficient and simple in design and components.

It is a further object of the present invention to provide an improved static inverter capable of producing an AC output which is variable over a wide range of voltages and frequencies.

It is another object of the present invention to provide a self-commutating inverter for supplying variable frequency and voltage to an AC load such as a single or polyphase motor.

It is still a further object of the present invention to provide a self-commutating inverter having silicon controlled rectifiers which are self-commutated with negligible dissipation of power.

According to one aspect of the present invention, an inverter is provided comprising a pair of controlled rectifiers such as silicon controlled rectifiers (SCR's) connected across a DC input. Gating of the SCR's at appropriate intervals converts the DC input to an AC output, the frequency of the output being determined by the frequency of gating. Turn-off or commutation of the SCR's is accomplished through a self-commutating circuit comprising capacitors and a reactive choke. Commutation of a first SCR which has been conducting during one-half cycle is effected by gating the second SCR to conduction to utilize energy stored on a first capacitor to induce a commutating voltage in the reactive choke which is applied as a reverse bias to the first SCR to commutate it off. In one embodiment of the invention, energy stored during one-half cycle of a first capacitor is transferred to a second capacitor by means of intermediate storage of energy in the windings of the choke. During the commutation period, negligible current is drawn from the DC source for the purpose of commutation, and commutation is accomplished almost entirely by energy which is transferred within the commutating circuit.

According to another aspect of the invention, regeneration current which is generated in the load is fed back to the supply through diodes paralleled across the SCR's.

In applications where a large range of speed control is required, thus necessitating a large range of frequency and voltage control, a pair of power diodes in series with the SCR's are provided to permit additional charging of the capacitors of the commutating circuit by ripple voltages appearing in the DC source. The addition of power diodes also permits utilization of external charging means for the commutating capacitors, thereby allowing the inverter to operate down to and including zero DC supply voltage.

Another aspect of the invention contemplates relocating the regeneration diodes to obtain higher efficiencies at higher output frequencies. Efficiency may also be improved through the use of an alternate form of reactor choke which contemplates resetting the flux in the cores of the choke by means of the load current.

Other objects and a fuller understanding of the invention will be evident from the following description and drawings.

DESCRIPTION OF PRIOR ART INVERTER

Figure 1:
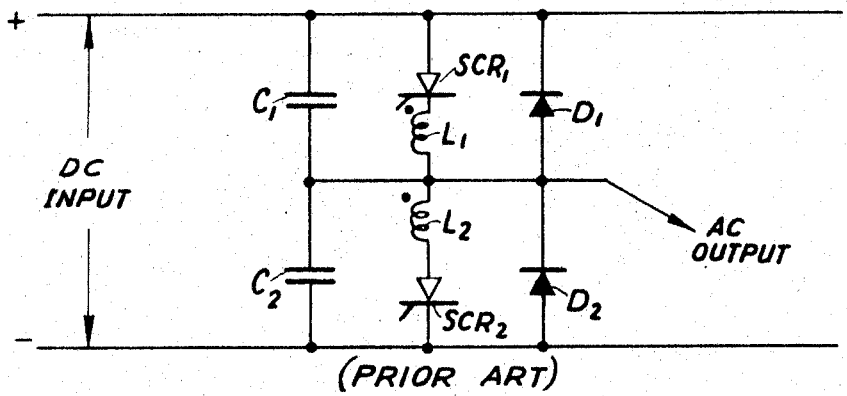
FIG. 1 is a schematic diagram of a prior art inverter.

Referring more particularly to the figures, FIG. 1 illustrates schematically a prior art self-commutating inverter utilizing silicon controlled rectifiers. As shown, connected across a DC input is a pair of commutating capacitors $C_1$ and $C_2$, silicon controlled rectifiers $SCR_1$ and $SCR_2$ in series with commutating choke coils $L_1$ and $L_2$, and regenerative diodes $D_1$ and $D_2$. Coils $L_1$ and $L_2$ form a commutating choke and are wound in close coupling when forming part of an air core choke, or are torodially wound when forming a part of an iron core choke. The AC output of the inverter is supplied to a load which may, for example, be the excitation windings of an AC motor, $SCR_1$ and $SCR_2$ are alternately gated to conduction by means of an appropriate gating circuit (not shown). The frequency of gating determines the frequency of the AC output to the load.

In operation, assuming that $SCR_1$ has been conducting during a positive half-cycle, load current will flow through $SCR_1$, $L_1$ and to the output. At the end of the positive half-cycle, commutation of $SCR_1$ is initiated by gating $SCR_2$ to conduction. $C_2$, which has been charged up to the level of the supply voltage during the positive half-cycle, now discharges through winding $L_2$ and $SCR_2$. Due to the negligible voltage drop across $SCR_2$ during conduction, $L_2$ initially supports a voltage equal to the voltage stored on $C_2$ or substantially the supply voltage. Since $L_1$ and $L_2$ are closely coupled and have equal windings, $L_1$ has induced in it a voltage equal to the voltage across $L_2$. The induced voltage in $L_1$ applies a reverse bias to $SCR_1$ sufficient to commutate $SCR_1$ off. The load current now finds a path through $C_1$ to the output.

Due to the high excitation current required to excite $L_2$, additional current is drawn from the DC source through $C_1$, $L_2$, $SCR_2$ to the negative side of the DC input. As the commutation cycle continues, $C_2$ discharges and $C_1$ charges up, and the voltages appearing across $L_2$ and $L_1$ will decrease. When these voltages are equal to one-half the supply voltage, the reverse biasing voltage on $SCR_1$ will be reduced to zero.

During the latter part of the commutating cycle, the current exciting $L_2$ increases, reaching a peak at the end of the commutating cycle. At the end of the cycle, $C_1$ will have been charged up, and the energy stored on $C_2$ will have been transferred to winding $L_2$. During the commutating period, current will have been drawn from the DC source both to charge capacitor $C_1$ and to excite winding $L_2$. Thus, at the end of the commutating cycle, $L_2$ has energy stored in it which is the sum of the energy transferred to it from capacitor $C_2$ and the energy received from the DC source. This energy is now dissipated by a current circulated from $L_2$ through $SCR_2$, $D_2$, back to $L_2$. This current decays exponentially, heating up $L_2$, $SCR_2$ and $D_2$.

Thus energy stored on commutating capacitor $C_2$ during the positive half-cycle is dissipated in heating up $L_2$, $SCR_2$ and $D_2$. Additional current has also been drawn from the line in charging up $C_1$ and in exciting $L_2$ during the commutation period. Due to the large dissipation of energy during the commutation period, this self-commutating inverter circuit would be inoperative under conditions requiring zero DC voltage and zero frequency, and commutation from an external source would be required. Moreover, the power loss during commutation greatly reduces the efficiency of the circuit and negates its use where a wide range of speed control of an AC motor necessitates an excitation frequency and voltage which may be varied over wide ranges.

DESCRIPTION OF THE EMBODIMENTS

Figure 2:
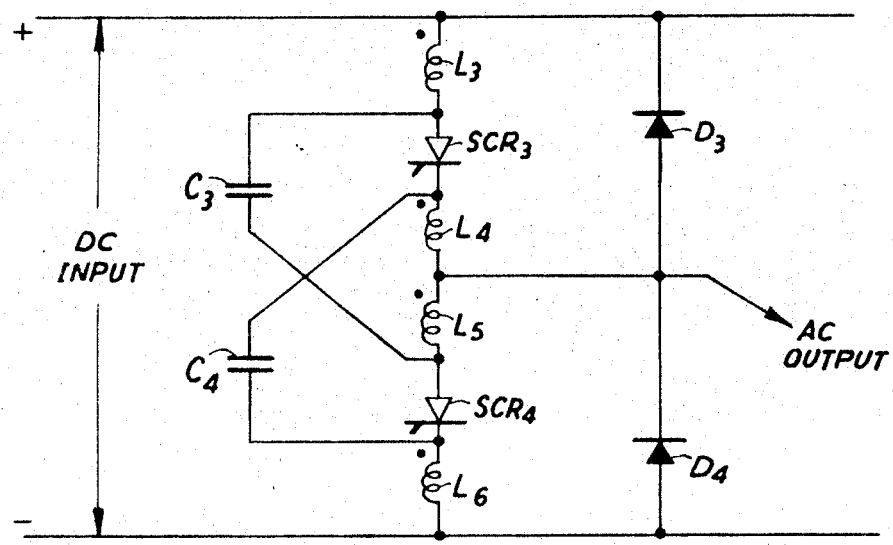
FIG. 2 is a schematic diagram of a preferred embodiment of the present invention.

Referring now to FIG. 2, there is shown a preferred embodiment of the self-commutating inverter of the present invention which obviates the disadvantages of the prior art inverter of FIG. 1. As illustrated schematically in FIG. 2, silicon controlled rectifiers $SCR_3$ and $SCR_4$ are connected across a DC input. Coils $L_3$ and $L_4$, and $L_5$ and $L_6$ are respectively connected in series with $SCR_3$ and $SCR_4$. As shown, coil $L_3$ is connected from the positive (+) side of the DC input to the anode of $SCR_3$; coils $L_4$ and $L_5$ are connected between the cathode of $SCR_3$ and the anode of $SCR_4$; and coil $L_6$ is connected between the cathode of $SCR_4$ and the negative (−) side of the DC input. Commutating capacitor $C_3$ is shown as connected between the anode of $SCR_3$ and the anode of $SCR_4$, and commutating capacitor $C_4$ is shown as being connected between the cathode of $SCR_3$ and the cathode of $SCR_4$.

A pair of regenerative diodes $D_3$ and $D_4$ are connected in series across the DC input, diode $D_3$ being connected in parallel across coil $L_3$, $SCR_3$ and coil $L_4$, and diode $D_4$ being connected in parallel across coil $L_5$, $SCR_4$ and coil $L_6$. The AC output is connected to a suitable load (not shown) such as the excitation windings of an AC motor, and is commonly connected to coils $L_4$ and $L_5$ and diodes $D_3$ and $D_4$.

Coils $L_3$, $L_4$, $L_5$, and $L_6$ form a commutating reactor and act in conjunction with commutating capacitors $C_3$ and $C_4$ to commutate silicon-controlled rectifiers $SCR_3$ and $SCR_4$. This commutating action will be described in greater detail hereinafter.

Figures 3, 4:
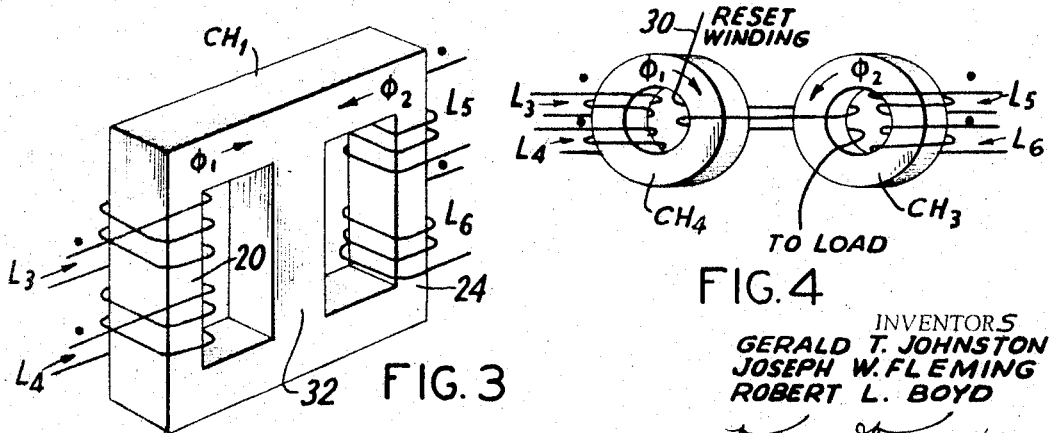
FIG. 3 is a schematic diagram of one form of reactive choke which may be used in the inverter of the present invention.
FIG. 4 is a schematic diagram of an alternate form of reactive choke which may be used in the inverter of the present invention.

As shown in FIGURE 3, in one preferred form of reactor, coils $L_3$ and $L_4$ are wound as shown about one leg 20 of rectangularly-shaped laminated iron core $CH_1$. Similarly, coils $L_5$ and $L_6$ are wound about leg 24 of core $CH_1$. Coils $L_3$, $L_4$, $L_5$ and $L_6$ are wound in the directions indicated in FIGURES 2 and 3.

An alternate and preferred commutating reactor is shown in FIGURE 4, wherein coils $L_3$ and $L_4$ are wound about core $CH_2$ and coils $L_5$ and $L_6$ are wound about core $CH_3$. Resetting of the flux in cores $CH_2$ and $CH_3$ is accomplished by means of reset winding $L_7$ which is wound around cores $CH_2$ and $CH_3$ and is in series with the load. The reactor configuration of FIGURE 4 permits use of higher grade magnetic materials having square hysteresis loop characteristics, thus increasing the efficiency of the inverter circuit. This greater efficiency in the commutating circuitry is required in applications where generation of frequencies well above normal power frequencies is required to provide control of high speed motors such as spindle motors and the like.

Referring to the embodiment of the present invention shown in FIGURE 2, commutation is accomplished as follows: During a positive half-cycle, $SCR_3$ conducts and load current is drawn from the positive side of the DC input through coil $L_3$, $SCR_3$, coil $L_4$ to the load. If the load produces regenerative current, diode $D_3$ is caused to conduct and the regenerative current is fed back to the positive side of the DC input through $D_3$. This regenerative current normally occurs at the beginning of a half-cycle, and once it has subsided, load current will be drawn along the path indicated above.

At the end of the positive half-cycle, $SCR_4$ is gated to conduction in order to initiate commutation of $SCR_3$. Any suitable gating circuit may be used to alternately gate $SCR_3$ and $SCR_4$ to conduction. It is only necessary that it be possible to adjust the circuit to gate $SCR_3$ and $SCR_4$ at time intervals that are variable in order to vary the frequency output of the inverter.

During the positive half-cycle, the voltage drops across $L_3$ and $L_4$, and $SCR_3$ are small, and capacitor $C_4$, $SCR_4$, and diode $D_4$ support substantially the supply voltage. Assuming coils $L_3$, $L_4$, $L_5$ and $L_6$ are wound as shown in FIGURE 3, the current passing through $L_3$ and $L_4$ during the positive half-cycle will saturate leg 20 with flux $\phi_1$. Flux $\phi_1$ produces in center leg 32 of core $CH_1$ a magnetomotive force tending to reset the flux in leg 24 under coils $L_5$ and $L_6$ in a direction opposite to the saturating flux $\phi_2$ produced during the negative half-cycle.

When silicon-controlled rectifier $SCR_4$ has been gated to conduction, the voltage built up on commutating capacitor $C_4$ will cause a magnetizing current to flow through coil $L_4$, coil $L_5$, rectifier $SCR_4$, to capacitor $C_4$. This magnetizing current is relatively small, and creates a magnetomotive force to cause the flux through leg 24 to decrease from a direction opposite to $\phi_2$ and eventually to build up in direction of $\phi_2$. The change in flux induces a voltage in windings $L_5$ and $L_6$. Since diode $D_3$ clamps the voltages induced in $L_5$ and $L_6$ to the DC supply voltage, coils $L_5$ and $L_6$ will support a voltage equal to the supply voltage. Preferably coils $L_5$ and $L_6$ are of equal turns and therefore each coil supports a voltage equal to one-half the supply voltage. These voltages are maintained across $L_5$ and $L_6$ until the end of the commutating cycle when they collapse suddenly.

The gating of $SCR_4$, which causes $C_4$ to discharge, creates a commutating current passing from $C_4$ through coil $L_4$, diode $D_3$, coil $L_3$, capacitor $C_3$, rectifier $SCR_4$, back to capacitor $C_4$. The initial voltages appearing across coils $L_3$ and $L_4$ are equal to the voltage on $C_4$. Preferably, coils $L_3$ and $L_4$ are of equal turns, and therefore each coil supports one-half the voltage of $C_4$. This combined voltage across coils $L_3$ and $L_4$ provides a reverse bias voltage across rectifier $SCR_3$ which commutates $SCR_3$ off. These voltages decrease as a cosine function reaching their zero value halfway through the commutation period.

This commutating current, limited by the saturated inductance of coils $L_3$ and $L_4$, reaches a peak halfway through the commutating period. At this point, the energy which was initially stored on commutating capacitor $C_4$ has been transferred to capacitor $C_3$ and coils $L_3$ and $L_4$. As an example, assume that the supply voltage is 300 volts, capacitors $C_3$ and $C_4$ are 20 microfarads each, and the load current is 10 amperes. Capacitor $C_4$ will be initially charged to 300 volts, representing 0.9 watt-seconds of stored energy. At the beginning of the commutating cycle, when $SCR_4$ is gated to conduction, the voltages induced on coils $L_5$ and $L_6$ by the decreasing flux in the reactor are each equal to 150 volts, the total voltage being 300 volts due to the clamping action of diode $D_3$.

The cummutating current produced by the discharge of $C_4$ builds up sinusoidally, reaching a peak halfway through the commutating period. At this point, the 0–9 watt-second energy which had appeared on $C_4$ at the beginning of the commutating cycle has been distributed as follows:

|   | Watt-seconds |
|---|---|
| $C_4$ | 0.225 |
| $C_3$ | 0.225 |
| $L_3$ | 0.225 |
| $L_4$ | 0.225 |

At this point, the current equals 90 amperes, capacitor $C_4$ and $C_3$ are each charged to 150 volts, and coils $L_3$ and $L_4$ each have zero volts appearing across them. Thus, the voltages appearing across $L_3$ and $L_4$ at the beginning of the commutating cycle have decreased to zero halfway through the commutating cycle.

During the second half of the commutating cycle, the commutating current continues to flow from $C_4$ through $L_4$, $D_3$, $L_3$, $C_3$, $SCR_4$, back to $C_4$. The energy stored up in coils $L_3$ and $L_4$ halfway through the commutating cycle is now given back to the commutating circuit to be stored on capacitor $C_3$. The voltages across $L_3$ and $L_4$ have reversed during this period and $SCR_3$ supports a forward voltage.

At the end of the commutating cycle, all of the energy which had been stored on capacitor $C_4$ at the beginning of the cycle will have been transferred through the intermediate storage of energy in the magnetic fields of coils $L_3$ and $L_4$ to capacitor $C_3$ which will be fully charged to 300 volts. At this time, the voltages appearing across coils $L_5$ and $L_6$ will suddenly collapse, and the current to the load will be switched from the positive side of the DC supply to the negative side through coil $L_6$, $SCR_4$ and coil $L_5$.

During the negative half-cycle, the current through coils $L_5$ and $L_6$ will saturate core $CH_1$ of FIG. 3 or core $CH_3$ of FIG. 4 with flux $\phi_2$ in the direction as shown. Core $CH_1$ of FIG. 3 will have a magnetomotive force produced in the center leg 22 which will reset the flux in leg 20 in a direction opposite to that shown for $\phi_1$. Similarly, the load current through the reset winding in FIG. 4 will reset the flux in core $CH_2$ of FIG. 4 in a direction opposite to that shown for $\phi_1$.

Commutation at the end of the negative half-cycle is accomplished in identical manner to that described above at the end of the positive half-cycle. Thus, at the beginning of the commutating period, $SCR_3$ is gated to conduction. $C_3$, which has been charged to the DC input voltage, will create a magnetizing current in coil $L_4$ which will produce a flux in the direction of $\phi_1$, thus causing the reverse flux to decrease in value. The decreasing flux induces voltages in coils $L_3$ and $L_4$. Due to the clamping action of diode $D_4$ and assuming that coils $L_3$ and $L_4$ are of equal turns, the induced voltage in each coil is equal to one-half the supply voltage.

Since capacitor $C_3$ is initially charged up to the DC input voltage, a commutating current will flow from $C_3$ through $L_5$, $D_4$, $L_6$, $C_4$, $SCR_3$, to $C_3$. The initial voltage on $C_3$ will appear across coils $L_5$ and $L_6$ acting as a reverse bias voltage to commutate $SCR_4$ off. The load current will find a new path through $L_6$, $C_4$, $SCR_3$, $C_3$, $L_5$, and to the load. During the commutating period, the energy initially stored on $C_3$ will be transferred to $C_4$ through the intermediate storage of energy within the saturated magnetic fields of coils $L_5$ and $L_6$. At the end of the commutating period, the commutating current will have reduced to zero, the voltages appearing across coils $L_3$ and $L_4$ will have collapsed and the load current will be switched to the positive side of the DC supply through $L_3$, $SCR_3$ and $L_4$.

Any regenerative current produced in the load during the negative half-cycle is fed back to the negative side of the DC input by means of regenerative diode $D_3$.

Thus it will be seen that during the commutating period, negligible energy is drawn from the DC input for the purposes of commutation, and commutation is effected by transferring energy from energy stored on either one of the commutating capacitors $C_3$ or $C_4$ to the other commutating capacitor through an intermediate storage of energy in coils $L_3$ and $L_4$ or coils $L_5$ and $L_6$. Thus the efficiency of the circuit of the present invention shown in FIG. 2 is much greater than the prior art inverter circuit shown in FIG. 1. Moreover, the power losses in the inverter of FIG. 2 during commutation are negligible compared to the substantial losses in the prior are inverter of FIG. 1.

Figure 5:
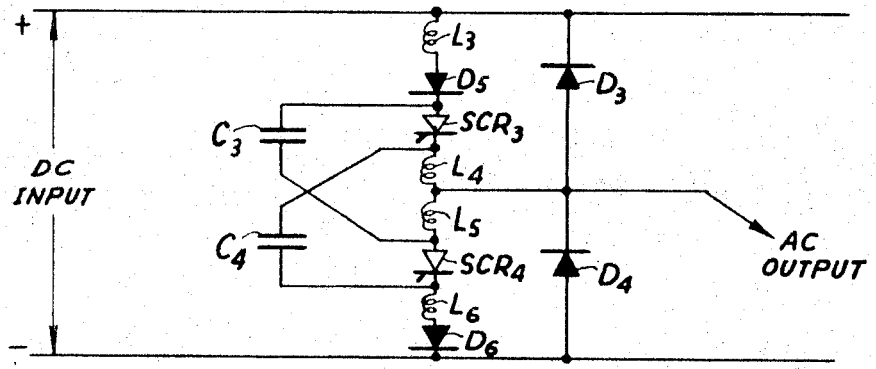
FIG. 5 is a schematic diagram of a modification of the embodiment of FIG. 2.

Referring now to FIG. 5, there is shown a modification of the embodiment of FIG. 2, wherein greater load current may be commutated. The circuit is substantially identical to that of FIG. 2, and the components and operation are substantially the same. In addition, however, didoe $D_5$ has been added in the circuit of $L_3$, $SCR_3$ and $L_4$ connected between $L_3$ and $SCR_3$ and diode $D_6$ has been added in the circuit of $L_5$, $SCR_4$, $L_6$, connected between $L_6$ and the negative (—) side of the DC input. The function of diodes $D_5$ and $D_6$ is as follows: Assuming that $SCR_3$ is conducting during a positive half-cycle, load current will be supplied from the positive side of the DC input through $L_3$, $D_5$, $SCR_3$, $L_4$ and then to the load. Commutating capacitor $C_4$ will be charged to the input voltage and capacitor $C_3$ will be discharged. If a peak ripple voltage now appears in the DC input, capacitor $C_4$ will be further charged up to this ripple voltage by a ripple current flowing through $L_3$, $D_5$, $SCR_3$, $C_4$, $L_6$ $D_6$, to the negative side of the input. If the ripple voltage should then drop below the peak ripple voltage, the charge on $C_4$ caused by the peak ripple voltage will be maintained due to the blocking effect of diode $D_6$ which will have a reverse voltage placed on it by the charge on $C_4$. At commutation time, the added charge on capacitor $C_4$ will increase the capability of the commutating circuit to commutate larger load currents.

In similar manner, during the negative half-cycle, the peak negative ripple voltage will be stored on capacitor $C_3$. Should the ripple voltage drop below peak value, diode $D_5$ will block discharge of Capacitor $C_3$, and the peak ripple voltage charge on $C_3$ will be available for commutation at the end of the negative half-cycle.

Figure 6:
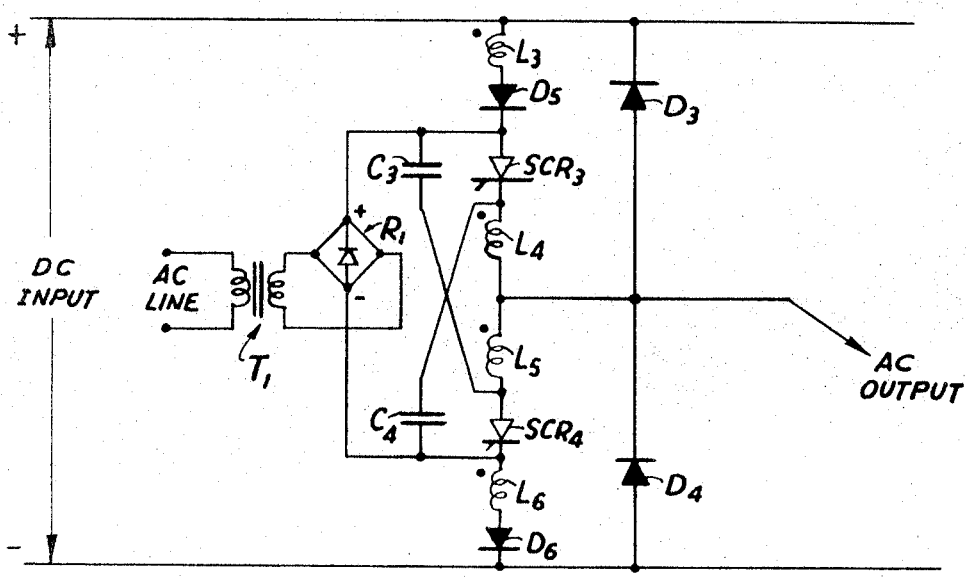
FIG. 6 is a schematic diagram of another modification of the embodiment of FIG. 2.

Referring now to FIG. 6, there is shown a modification of the embodiment of FIG. 5, wherein external charging means are provided to charge commutating capacitors $C_3$ and $C_4$. This modification is especially suitable for use where a wide range of speed control of AC motors is required thus necessitating a wide range of frequency and voltage control. Due to the speed characteristics of AC induction and synchronous motors, voltage and frequency must be changed simultaneously to obtain maximum efficiency in the speed control. Thus, as the control frequency is reduced to zero, the control voltage and frequency must also be reduced to zero. Since the control voltage supplied by the inverter to the load is dependent upon the DC input voltage, it is necessary to vary the DC input voltage as the commutating frequency is varied. At voltages approaching zero voltage, there will be insufficient input voltage to charge commutating capacitors $C_3$ and $C_4$ to effect commutation of $SCR_3$ and $SCR_4$. Heretofore, it was necessary to utilize an expensive external commutating source to provide commutating voltages to commutate the SCR's at low voltage and frequency.

The circuit of FIG. 6 provides a simple solution to the problem of producing sufficient commutating voltage at control frequencies and voltages down to zero. As shown, a bridge rectifier circuit $R_1$ is connected across capacitors $C_3$ and $C_4$. Rectifier $R_1$ rectifies alternating current provided from the AC line by transformer $T_1$. The transformer $T_1$ and rectifier $R_1$ comprise an independent DC source which, during a given half-cycle, is used to charge up either capacitor $C_3$ or capacitor $C_4$ to any desired voltage. For example, if it is desired to charge capacitor $C_4$ during a positive half-cycle, $SCR_3$ will be conducting and current will flow from the positive terminal of $R_1$ through $SCR_3$, $C_4$ and back to the negative terminal. The voltage to which capacitor $C_4$ is charged will depend upon the requirements of the inverter circuitry. This charge will not be dissipated through the inverter circuit due to the blocking effect of diode $D_6$. Thus $D_6$ must be capable of blocking voltage equal to the difference between the voltage of the DC input and the voltage on capacitor $C_4$. The voltage on $C_4$ will be available at the end of the positive half-cycle to commutate $SCR_3$ off. In similar manner, during the negative half-cycle, the independent DC source of $T_1$ and $R_1$ will charge up $C_3$. This charge will be maintained on $C_3$ by the blocking effect of diode $D_5$. At the end of the negative half-cycle, the charge on $C_3$ will be available to commutate $SCR_4$ off.

Thus, through the addition of an independent DC source to charge the commutating capacitors, commutation may be effected down to zero DC input voltage, thus greatly increasing the range over which the inverter may be used.

Figure 7:
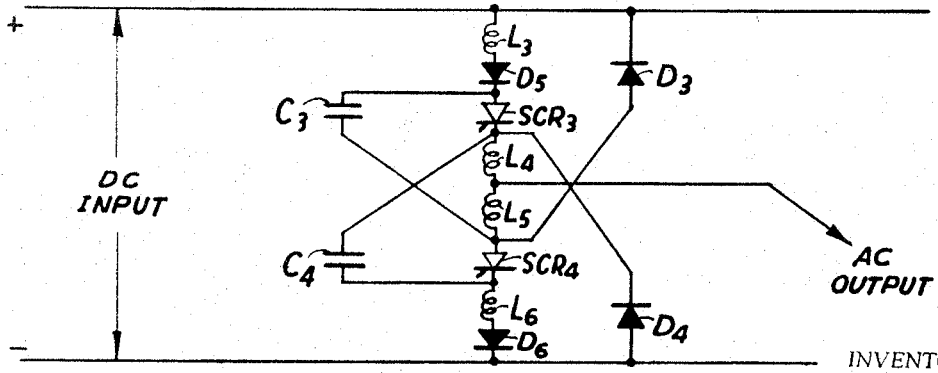
FIG. 7 is a schematic diagram of another embodiment of the present invention.

Referring now to FIG. 7, there is shown a modification of the present invention which is especially applicable to high-frequency operation where load current does not fall below a predetermined minimum value. As shown, the components are the same as the circuit of FIG. 5. However, regeneration diodes $D_3$ and $D_4$ have been relocated. As shown, diode $D_3$ is connected between the anode of $SCR_4$ and the + of the DC input and diode $D_4$ is connected between the cathode of $SCR_3$ and the — of the DC input. Operation of the diodes to transfer regenerative current from the load to the DC input is not affected, since regenerative current flowing from the load through coil $L_5$ and diode $D_3$ during a positive half-cycle and from the load through coil $L_4$ and diode $D_4$ during a negative half-cycle normally occurs at the beginning of the half-cycle when coils $L_5$ and $L_4$ respectively will still be saturated.

Operation of the circuit of FIG. 7 is as follows:

Assuming that $SCR_3$ has been conducting during a positive half-cycle, capacitor $C_4$ will be charged up to the input voltage. When commutation is initiated by gating $SCR_4$ to conduction, a magnetizing current will flow from $C_4$ through $L_4$, $L_5$, $SCR_4$, to $C_4$. The magnetizing current through coil $L_5$ will induce in it a voltage equal to the voltage across $C_4$, i.e., approximately the input voltage. A like voltage will be induced in coil $L_6$ if it be assumed that coil $L_5$ and coil $L_6$ are of equal turns. Thus, the load voltage will momentarily increase to twice the input voltage, and a reverse bias equal to the input voltage will be placed across $SCR_4$ to commutate it off. Where the load is a motor, the sharp increase of load voltage will be momentary and will not affect the operation of the motor. Current will now flow from the DC supply through coil $L_3$, $D_5$, $C_3$, $SCR_4$, $C_4$, coil $L_4$, to the load. During the commutating period, the only currents flowing through the inverter circuit are the load current and the magnetizing current, which is negligible. At the end of the commutating period, when capacitor $C_3$ has been charged up and capacitor $C_4$ discharged, the voltages across the coils $L_5$ and $L_6$ will collapse, and the current to the load will be supplied from the negative side of the DC input through $D_6$, $L_6$, $SCR_4$, and $L_5$.

Since only load current has flowed during the commutating cycle, (neglecting the magnetizing current which was negligible) smaller capacitors may be used for $C_3$ and $C_4$. However, in order for the circuit of FIG. 7 to operate properly, the load current must not fall below a predetermined minimum, since the time for charging capacitors $C_3$ and $C_4$ increases as the load current drops. If the time for discharging the capacitors is too long, the core material will saturate, sharply increasing the magnetizing current. Increase of the magnetizing current will discharge the capacitor more rapidly, producing substantial losses in the circuit. To avoid these losses, load current must be maintained above a certain minimum level.

Figure 8:
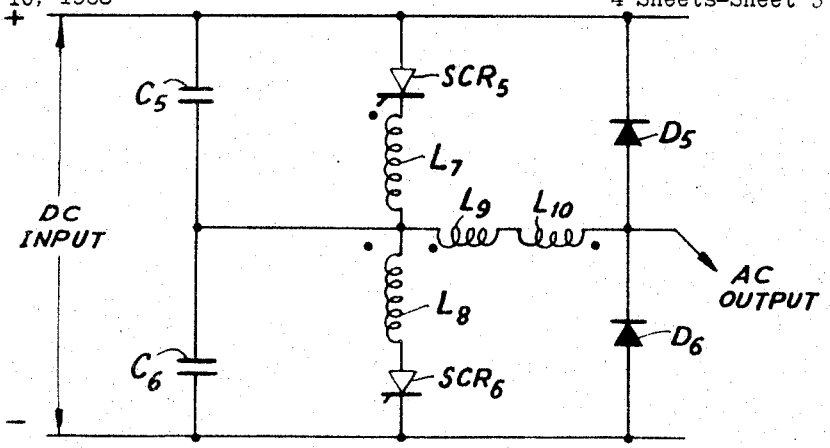
FIG. 8 is a schematic diagram of yet another embodiment of the present invention.
Figure 8A:
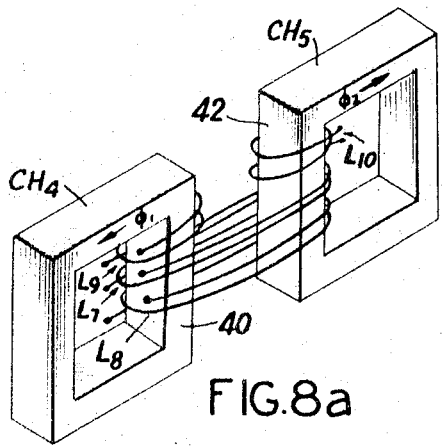
FIG. 8a is a schematic diagram of a preferred form of reactive choke for use in the embodiment of FIG. 8.

Referring now to FIGS. 8 and 8a there is shown an alternate embodiment of the inverter of the present invention. As shown a pair of capacitors $C_5$ and $C_6$ are connected in series across a DC input. A silicon controlled rectifier $SCR_5$ and coil $L_7$, are connected in parallel across capacitor $C_5$ and silicon controlled rectifier $SCR_6$ and coil $L_8$ are connected in parallel across capacitor $C_6$. A pair of regeneration diodes $D_5$ and $D_6$ are also connected in series across the input. A pair of coils $L_9$ and $L_{10}$ are connected in series between the points of common connection of coils $L_7$ and $L_8$ and diodes $D_5$ and $D_6$. Coils $L_7$, $L_8$, $L_9$ and $L_{10}$ are wound with the polarities and comprise a commutating choke.

Referring now to FIG. 8a, there is shown a preferred manner of winding coils $L_7$, $L_8$, $L_9$, and $L_{10}$. As shown a pair of choke cores $CH_4$ and $CH_5$ of magnetic material having substantially square hysteresis characteristic are provided. Coil $L_9$ is wound around leg 40 of core $CH_4$ and coil $L_{10}$ is wound around the leg 42 of core $CH_5$. Coils $L_7$ and $L_8$ are each wound about both leg 40 of core $CH_4$ and leg 42 of core $CH_5$. In order to provide self-resetting of the flux in the cores, coils $L_9$ and $L_{10}$ are of higher turns than coils $L_7$ and $L_8$. Thus, for example, if coils $L_7$ and $L_8$ are of 80 turns each, coils $L_9$ and $L_{10}$ are of greater turns, for example, 90 turns each.

Operation of the inverter of FIGS. 8 and 8a is as follows:

Assuming that during a positive half-cycle controlled rectifier $SCR_5$ has been in the conducting state and controlled rectifier $SCR_6$ has been in the non-conducting state, current will flow from the positive side of the DC input through rectifier $SCR_5$, coil $L_7$, coils $L_9$ and $L_{10}$ and thence to the load. During conduction, the voltage drops across $SCR_5$, $L_7$, $L_9$ and $L_{10}$ will be negligible and capacitor $C_6$ and coil $L_8$ and controlled rectifier $SCR_6$ will support substantially the DC input voltage. During this positive half-cycle the current passing through coils $L_7$, $L_9$ and $L_{10}$ will produce a flux in cores $CH_4$ and $CH_5$. As shown in FIG. 8a, the current through coils $L_8$ and $L_9$ will combine to saturate core $CH_4$ positively in the direction of flux $\phi_1$ and the current through coil $L_{10}$ will saturate core $CH_5$ in a negative direction opposite to the direction shown for flux $\phi_2$. Diode $D_5$ is provided to allow regeneration current from the load to flow back to the DC input.

Commutation of controlled rectifier $SCR_5$ is initiated by gating controlled rectifier $SCR_6$ to conduction. Energy stored on capacitor $C_6$ will cause a current to flow from the positive side of $C_6$ through coil $L_8$ and controlled rectifier $SCR_6$ to the negative side of capacitor $C_6$ (the negative side of the DC input). Since the flux in core $CH_5$ has been reset during the positive half-cycle, current through coil $L_8$ produces a change in flux in core $CH_5$ from a direction opposite to that shown for $\phi_2$ in FIG. 8a to a direction the same as that shown for $\phi_2$. The changing flux in core $CH_5$ produces an induced voltage in coil $L_8$. This changing flux also by transformer action induces a voltage in coil $L_7$ and coil $L_{10}$. Since coils $L_7$ and $L_8$ are preferably of equal turns the voltage induced in coil $C_7$ will equal the voltage induced in coil $L_8$. The voltage induced in coil $L_8$ produces a reverse bias voltage across rectifier $SCR_5$ to commutate it off.

The voltage induced in coil $L_{10}$ by the current flow in coil $L_8$ produces a current in the circuit comprising capacitor $C_5$, coils $L_9$ and $L_{10}$ and regenerative diode $D_5$. This current is limited by the saturated inductance of coil $L_9$ and acts to charge up capacitor $C_5$. During the first half of the commutation period this current also causes energy to be stored in coil $L_9$. During the second half of the commutation period the energy stored in coil $L_9$ will be returned to the circuit to aid the charging of capacitor $C_5$.

During commutation the load current finds a new path through capacitor $C_5$ and coils $L_9$ and $L_{10}$ to the output. At the end of the commutation period capacitor $C_6$ will be discharged and the voltages induced in coils $L_8$, $L_{10}$ and $L_7$ will have been reduced to zero. At this point capacitor $C_5$ will be completely charged up and the current to the load will switch to the negative side of the input through coil $L_8$ and $SCR_6$.

Commutation at the end of a negative cycle is substantially similar to that described for the positive cycle. Thus during the negative cycle, controlled rectifier $SCR_6$ will be conducting and capacitor $C_5$ will be charged up. Commutation of $SCR_6$ is initiated by gating $SCR_5$ to conduction. Capacitor $C_5$ will discharge through coil $L_7$ and $SCR_5$ thereby inducing a voltage in coils $L_7$, $L_8$ and $L_{10}$. The voltage induced in coil $L_8$ commutates $SCR_6$ off and the voltage induced in coil $L_{10}$ causes a current to flow to charge capacitor $C_6$. During the first half of the commutation period energy will be stored in $L_{10}$ said energy being given back to the circuit during the second half of the commutation period to aid in the charging of capacitor $C_6$.

Figure 9A:
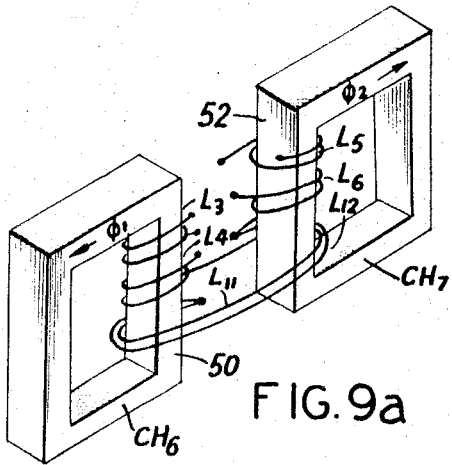
FIG. 9a is a schematic diagram of a preferred form of reactive choke for use in the embodiment of FIG. 9.
Figure 9:
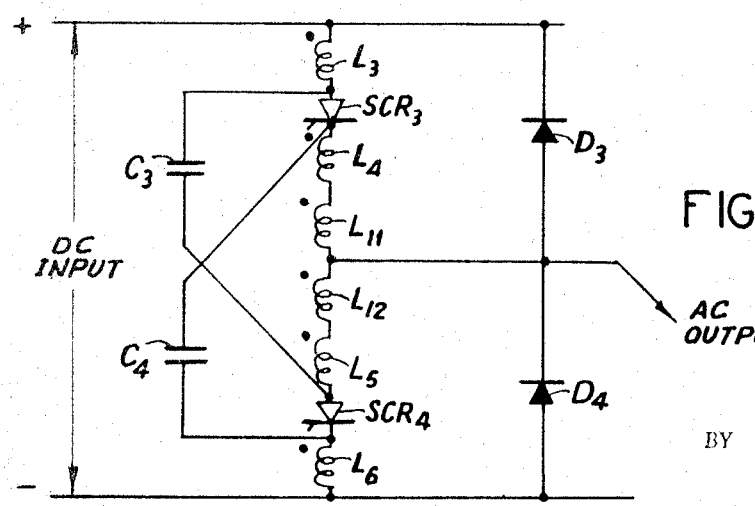
FIG. 9 is a schematic diagram of still another embodiment of the present invention.

Referring now to FIGS. 9 and 9a there is shown a modification of the embodiment of the present invention of FIG. 2. In applications where the coils of FIG. 2 are wound in the manner of FIG. 4 it was pointed out above that resetting of the cores may be accomplished by providing a reset winding wound about both cores and connected to the output. In the embodiment shown in FIGS. 9 and 9a reset windings $L_{11}$ and $L_{12}$ are provided as shown. Winding $L_{11}$ is connected in series with winding $L_4$ between $L_4$ and the output and winding $L_{12}$ is connected in series with winding $L_5$ between $L_5$ and the output. As shown in FIG. 9a a pair of choke cores $CH_6$ and $CH_7$ are provided having substantially square hysteresis loop characteristic. Coils $L_3$ and $L_4$ are wound about leg 50 of core $CH_6$ and soils $L_5$ and $L_6$ are wound about leg 52 of core $CH_7$. Coils $L_{11}$ and $L_{12}$ are each wound about both legs 50 of core $CH_6$ and leg 52 of core $CH_7$. Coil $L_{11}$ constitutes the winding between point 54 and point 56 and coil $L_{12}$ constitutes the winding between point 56 and point 58. Load current flowing through coil $L_{11}$ during a positive half-cycle will reset the flux in core $CH_7$ in a direction opposite to that shown for $\phi_2$. Similarly, current flowing through coil $L_{12}$ during a negative half-cycle will reset the flux in core $CH_6$ in a direction opposite to that shown for $\phi_1$. The operation of the circuit shown in FIG. 9 is otherwise identical to that described hereinabove with respect to the circuit of FIG. 2.

Figure 10:
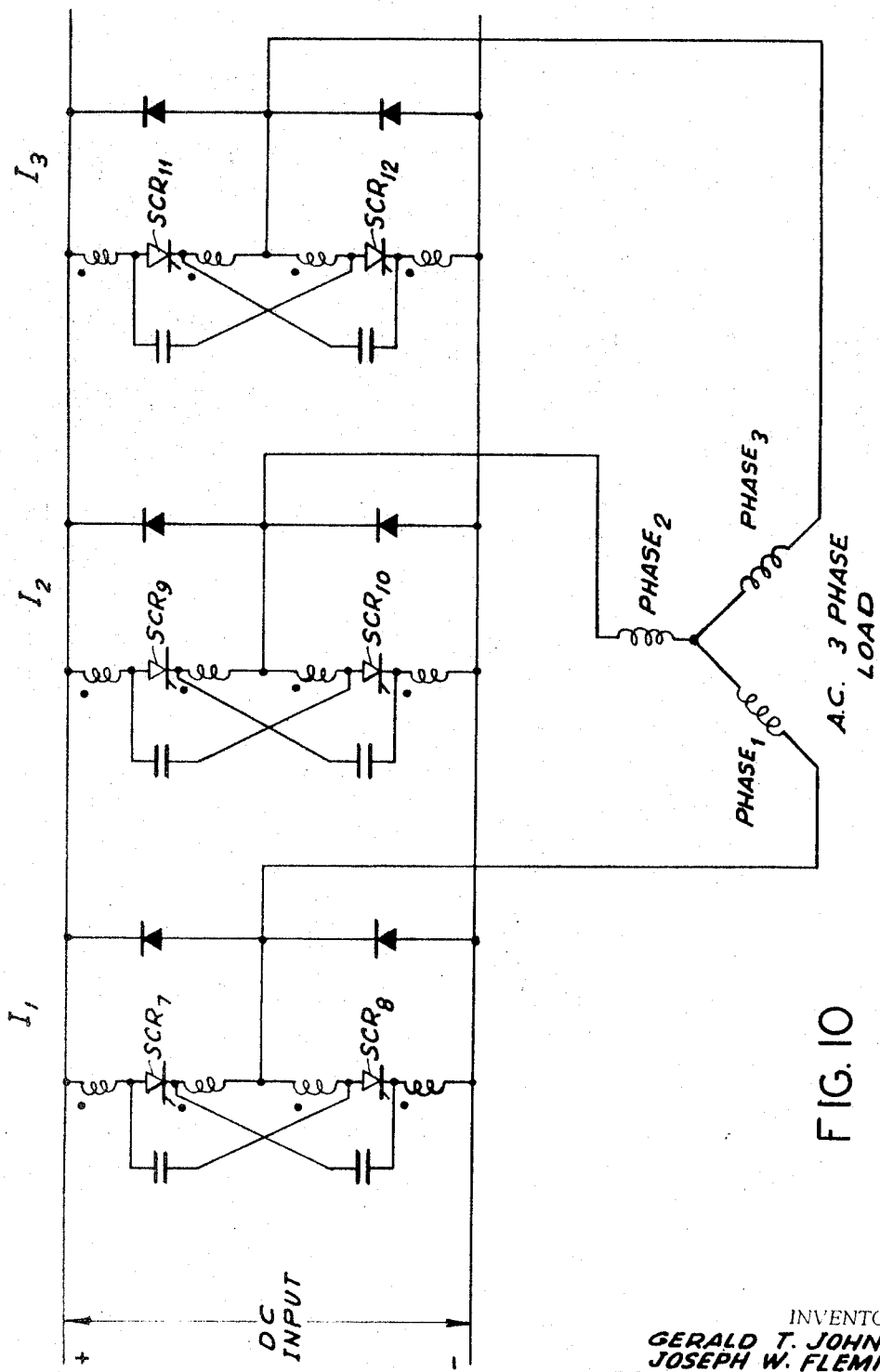
FIG. 10 is a schematic diagram of a three-phase AC circuit utilizing the inverter of FIG. 2.

Referring now to FIGURE 10, there is shown a three-phase load representing the excitation winding of a three-phase AC motor. A separate inverter stage substantially identical to that shown in FIG. 2 is provided for each phase. Thus, inverter state $I_1$ is provided for supplying variable frequency excitation to phase 1; inverter state $I_2$ is provided for supplying excitation to phase 2, and inverter state $I_3$ is provided for supplying frequency excitation to phase 3. The operation of each of stages $I_1$, $I_2$, and $I_3$ is identical to the operation described hereinabove for the inverter of FIG. 2. In order to supply three-phase adjustable frequency to the three-phase load, silicon controlled rectifiers $SCR_7$, $SCR_8$, $SCR_9$, $SCR_{10}$, $SCR_{11}$, $SCR_{12}$ must be gated at appropriate intervals. In order to achieve firing of all six SCR's during a full 360° cycle, the SCR's must be sequentially gated at time intervals equal to 60° ⅙ of a full cycle.

In operation, assume $SCR_7$, $SCR_{10}$, and $SCR_{12}$ are conducting. Then load current will flow from the positive side of the DC supply through $SCR_7$, phase 1, and thence to the negative supply of the DC supply through phase 2 and $SCR_{10}$ and phase 3 and $SCR_{12}$. At a time interval equal to ⅙ of a full cycle, $SCR_9$ is gated to conduction and $SCR_{10}$ commutated off. Load current will now flow from the positive side of the DC supply through $SCR_7$ and $SCR_9$ and thence to the negative side of the supply through $SCR_{12}$. Thereafter, sequential gating of $SCR_8$, $SCR_{11}$, $SCR_{10}$, $SCR_7$, and $SCR_{12}$ at intervals of ⅙ of a full cycle, converts the DC input into a three-phase AC output to the three-phase load. The frequency of the output may be varied by varying the intervals for gating the SCR's to conduction.

Although specific reference has been made to silicon controlled rectifiers hereinabove it will be understood that devices which have equivalent characteristics may be used in lieu thereof. Thus semiconductor materials other than silicon may be used in the controlled rectifier. Similarly it will be understood that any unidirectional current carrying device whose current carrying capability may be controlled is considered to be within the scope of the present invention.

It will be further understood that although specific forms of commutating circuits have been described that equivalents thereto are considered to be within the scope of the present invention.

What is claimed is:

1. An inverter for supplying an alternating current output from a direct current input comprising a pair of input terminals, a first circuit and a second circuit serially connected across said input terminals, the point of connection between said circuits defining an output terminal, said first circuit comprising a first controlled rectifier, and first and second coil means serially connected, said second circuit comprising a second controlled rectifier and third and fourth coil means serially connected, said first, second, third and fourth coil means being magnetically coupled, a first commutating capacitor connected in parallel with said first controlled rectifier and one of said coil means respectively in each of said first and second circuits and a second commutative capacitor connected in parallel with said second controlled rectifier and one of said coil means respectively in each of said first and second circuits.

2. The inverter of claim 1 wherein said coil means respectively of said first and second circuits with which said first capacitor is connected in parallel are the same as said coil means respectively of said first and second circuits with which said second capacitor is connected in parallel, said respective coil means being serially connected with the common connection therebetween defining said output terminal.

3. An inverter for supplying an alternating current output from a direct current input comprising first and second controlled rectifier means serially connected across said direct current input, said controlled rectifier means being adapted to be alternately switched between the conducting and non-conducting states, such that when one of said controlled rectifier means is conducting, the other of said controlled rectifier means is not conducting, and self-commutating means electrically connected to said first and said second controlled rectifier means, said self-commutating means comprising first and second capacitor means connected in shunting relation respectively across said first and said second controlled rectifier means, and commutating reactor means comprising first and second coil means connected in series relation with said first controlled rectifier means, and third and fourth coil means connected in series relation with said second controlled rectifier means, each of said first, second, third and fourth coil means being magnetically coupled to each other of said coil means.

4. The inverter of claim 3 wherein said commutating reactor means includes core means of magnetic material, said core means having first and second legs and wherein said first and second coil means are wound about said first leg of said core means and said third and fourth coils are wound about said second leg of said core means.

5. The inverter of claim 3 wherein said commutating reactor means includes first core means and second core means, both of said core means comprising magnetic material and wherein said first and second coil means are wound about said first core means and said third and fourth coil means are wound about said second core means and including fifth coil means wound about both of said core means and being connected to said other coil means in such manner that alternating current output flows through said coil means to alternately reset the flux in said first and said second cores.

6. An inverter for supplying an alternating current output from a direct current input comprising first and second input terminals, first and second controlled rectifier means, each of said rectifier means having first and second terminals, a commutating reactor having first, second, third and fourth coils, said coils of said reactor and said first and said second controlled rectifier means being connected serially across said input terminals in such manner that said first coil is connected between said first input terminal and said first terminal of said first rectifier means, said second and third coils are connected together between said second terminal of said first rectifier means and said first terminal of said second rectifier means and said fourth coil is connected between said second terminal of said rectifier means and said second input terminal, a first capacitor connected between the first terminals respectively of said first and said second rectifier means, and a second capacitor connected between the second terminals respectively of said first and said second rectifier means.

7. The inverter of claim 6 including a first diode connected between said first terminal and the junction between said second and third coils and a second diode connected between said second terminal and said junction between said second and third coils, said junction defining an output terminal.

8. The inverter of claim 6 wherein said commutating reactor comprises a core of magnetic material, said core having a first leg about which said first and second coils are wound and said core having a second leg about which said third and fourth coils are wound.

9. The inverter of claim 6 wherein said commutating reactor comprises a first core and a second core, said first and second coils of said reactor being wound about said first core and said third and fourth coils of said choke means being wound about said second core and including a fifth coil wound about both of said cores and being electrically connected to said other coils in such manner that alternating current output flows through said fifth coil to alternately reset the flux in said first and said second cores.

10. The inverter of claim 9 wherein said fifth coil is electrically connected to said output terminal.

11. The inverter of claim 9 wherein said fifth coil comprises a first set of windings connected between said second coil of said reactor and said output terminal and a second set of windings connected between said third coil of said reactor and said output junction and wherein both said first set and said second set of windings of said fifth coil are wound about both of said cores.

12. The inverter of claim 9 wherein said first and said second cores are of magnetic material having a square hysteresis characteristic.

13. The inverter of claim 7 including a third diode connected in series relation with said first controlled rectifier means between said first input terminal and said first terminal of said first controlled rectifier means and a fourth diode connected in series relation between said second input terminal and said second terminal of said second controlled rectifier means.

14. The inverter of claim 13 including independent direct current charging means connected between said first terminal of said first controlled rectifier means and said second terminal of said second controlled rectifier means.

15. The inverter of claim 14 wherein said independent direct current charging means comprises a source of alternating current and a bridge rectifier connected to said alternating current source.

16. An inverter for supplying an alternating current output from a direct current input comprising first and second input terminals, first controlled rectifier means, second controlled rectifier means, said first and said second controlled rectifier means each having first and second terminals, a commutating reactor having first, second, third and fourth coils, a first diode and a second diode, said first and second controlled rectifier means, said coils of said reactor and said first and said second diodes being connected serially across said input terminals in such manner that said first coil and said first diode are connected together between said first input terminal and said first terminal of said first controlled rectifier means, said second and third coils are connected between said second terminal of said first controlled rectifier means and said first terminal of said second controlled rectifier means, said second and third coils being connected together to form a junction defining an output terminal and said fourth coil and said second diode being connected together between said second terminal of said second controlled rectifier means and said second input terminal, a first capacitor connected between the first terminals respectively of said first and second controlled rectifier means, a second capacitor connected between said second terminals respectively of said first and second controlled rectifier means, a third diode connected between said first terminal of said second controlled rectifier means and said first input terminal and a fourth diode connected between the second terminal of said first controlled rectifier means and said second input terminal.

17. An inverter for supplying an alternating current output from a direct current input comprising first and second input terminals, first and second capacitors, said first and said second capacitors being serially connected together between said input terminals, first and second controlled rectifiers, each of said controlled rectifiers having first and second terminals, a commutating reactor having first, second, third and fourth coils, said first and said second controlled rectifiers and said first and second coils of said reactor being connected between said input terminals in such manner that said first terminal of said first controlled rectifier is connected to said first input terminal, said first and second coils are connected together and between said second terminal of said first controlled rectifier and said first terminal of said second controlled rectifier and said second terminal of said second controlled rectifier is connected to said second input terminal, first and second diodes, said diodes being connected together between said input terminals, the junction between said diodes defining an output terminal, the junction between said first and second capacitors and the junction between said first and second coils being commonly connected and said third and said fourth coils being connected together between the junction of said first and second coils and the junction between said first and second diodes, said third and said fourth coils having windings wound in opposite polarity, each of said first, second, third and fourth coils being magnetically coupled with each of said other of said coils.

18. The inverter of claim 17 wherein said commutating choke comprises a first core and a second core, said cores being of magnetic material and wherein said first and second coils are respectively wound about both said first and said second cores, said third coil is wound about said first core and said fourth coil is wound about said second core.

19. The inverter of claim 18 wherein said first and said second cores are of magnetic material having square hysteresis loop characteristic.

20. The inverter of claim 18 wherein the turns of said third and said fourth coils are greater in number than the turns of said first and said second coils.

References Cited

UNITED STATES PATENTS

| | | | |
|---|---|---|---|
| 2,297,674 | 9/1942 | Stevens | 323—48 |
| 3,311,809 | 3/1967 | Corey et al. | 321—45 |
| 3,334,290 | 8/1967 | Landis | 321—16 |
| 3,349,315 | 10/1967 | Studtmann | 321—45 |
| 3,351,841 | 11/1967 | Lipman et al. | 321—45 |
| 3,355,654 | 11/1967 | Risberg | 321—44 |
| 3,373,337 | 3/1968 | Han-Min Hung | 323—24 XR |
| 3,384,804 | 5/1968 | Salihi | 321—5 |

JOHN F. COUCH, Primary Examiner

W. M. SHOOP, Jr., Assistant Examiner